(12) United States Patent
Rajkotia

(10) Patent No.: US 7,542,440 B2
(45) Date of Patent: Jun. 2, 2009

(54) APPARATUS AND METHOD FOR PROVIDING QUALITY OF SERVICE FOR MIXED TRAFFIC IN A WIRELESS NETWORK BASE STATION

(75) Inventor: Purva R. Rajkotia, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1139 days.

(21) Appl. No.: 10/298,728

(22) Filed: Nov. 18, 2002

(65) Prior Publication Data
US 2004/0095901 A1    May 20, 2004

(51) Int. Cl.
*H04W 4/00* (2006.01)
*H04W 72/00* (2006.01)
*H04L 12/28* (2006.01)
*H04L 12/56* (2006.01)

(52) U.S. Cl. .................. 370/328; 370/395.4; 455/452.1; 455/452.2; 455/453

(58) Field of Classification Search .................. 370/310, 370/328, 395.21, 395.4; 455/403, 422.1, 455/450, 452.1, 452.2, 453
See application file for complete search history.

(56) References Cited

U.S. PATENT DOCUMENTS 7,167,447 B2 * 1/2007 Puuskari et al. ............. 370/231
2003/0072297 A1 * 4/2003 Oses et al. .................. 370/349

\* cited by examiner

*Primary Examiner*—Alexander Eisen
*Assistant Examiner*—Matthew W Genack

(57) ABSTRACT

An apparatus and method for providing quality of service for the transmission of data packets from a base station in a wireless network to a plurality of mobile stations in a coverage area of the wireless network. The apparatus comprises a packet discriminator for receiving data packets from user devices requesting to transmit data packets to the mobile stations. The packet discriminator determines whether each data packet is a real time application or a non-real time application. The apparatus also comprises a real time traffic packet processor for receiving first selected data packets for real time applications, and a non-real time traffic packet processor for receiving second selected data packets for non-real time applications.

24 Claims, 3 Drawing Sheets

APPARATUS AND METHOD FOR PROVIDING QUALITY OF SERVICE FOR MIXED TRAFFIC IN A WIRELESS NETWORK BASE STATION

CROSS-REFERENCE TO RELATED APPLICATIONS

The present invention is related to that disclosed in U.S. patent application Ser. No. 10/228,425, filed concurrently herewith, entitled "APPARATUS AND METHOD FOR SCHEDULING FORWARD CHANNEL TRANSMISSIONS IN A WIRELESS NETWORK BASE STATION." U.S. patent application Ser. No. 10/298,425 is commonly assigned to the assignee of the present invention. The disclosures of the related patent application are hereby incorporated by reference for all purposes as if fully set forth herein.

TECHNICAL FIELD OF THE INVENTION

The present invention is directed generally to wireless communication networks and, more specifically, to an improved forward channel scheduling algorithm for use in a base station of a wireless network.

BACKGROUND OF THE INVENTION

The radio frequency (RF) spectrum is a limited commodity. Only a small portion of the spectrum can be assigned to each communications industry. The assigned spectrum, therefore, must be used efficiently in order to allow as many frequency users as possible to have access to the spectrum. Multiple access modulation techniques are some of the most efficient techniques for utilizing the RF spectrum. Examples of such modulation techniques include time division multiple access (TDMA), frequency division multiple access (FDMA), and code division multiple access (CDMA).

Wireless service providers also seek other ways of using the available spectrum as efficiently as possible. One important technique for maximizing spectral efficiency is to minimize overhead message traffic. If the number of overhead messages transmitted is reduced, less overhead channels are required to carry overhead messages. This frees up spectrum for user traffic. Also, reducing the number of overhead messages reduces the processing load in both the mobile stations and the base stations of the wireless network. Spectral efficiency may also be improved by selecting the optimum modulation technique in order to maximize throughput and to minimize retransmissions of data.

The IS-95 wireless system (i.e., cdmaOne) was designed to support voice traffic. However, the next generation of wireless systems must support both voice and high-speed packet data services simultaneously. This poses an immense challenge in configuring a wireless system that is tuned and optimized for both services, since these services impose vastly different requirements.

Voice and simple data services (e.g., fax, asynchronous data) require only relatively low throughput (e.g., 8 Kbps to 13 Kbps). The throughput for these services is symmetric (i.e., similar data rates in the forward channel and reverse channel). Voice and simple data services also require low latency and uniform Quality of Service (QoS) for the entire duration of the service connection.

On the other hand, packet data services are generally asymmetrical, where the data rate on the forward channel (i.e., downlink) is much greater than the reverse channel (i.e., uplink). Also, the data throughput for packet data services is bursty in nature and can tolerate some degree of latency.

The 1x configuration of CDMA2000 supports data rates up to 614 Kbps for packet data services. However, CDMA2000-1x does not meet the 3G requirements for packet data services up to 2 Mbps. The 3x configurations of CDMA2000 support up to 2 Mbps and meet this 3G requirement. However, CDMA2000-3x configurations require three carrier frequencies (1.25 MHz) each, which increases the complexity of both the base station and the mobile station.

The high rate packet data (HRPD) system solves some of these issues, but it requires a different carrier frequency. Also, the HRPD cannot support real-time services and requires completely new technology and a new protocol stack. HRPD also introduces new network elements and newer interfaces into the network. Also, HRPD is not backwardly compatible with the IS-95 family of standards.

CDMA2000-EV/DV technology has been introduced to overcome these problems. CDMA2000-EV/DV supports simultaneous voice and data services and has higher data throughput than a HRPD system. The peak data rate in the current forward link framework proposal is up to 3.84 Mbps. To support higher data rates and throughput, the scheduling of users must be done efficiently. An efficient scheduling algorithm is needed to guarantee higher throughput and better handling of the number of data users and voice users.

There is therefore a need in the art for improved systems and methods for scheduling the transmission of data packets in the forward channel of a wireless network. In particular, there is a need for an efficient scheduling apparatus that achieves an optimum throughput by maximizing the forward channel transmission data rate without significantly increasing the number or re-transmissions.

SUMMARY OF THE INVENTION

CDMA2000-EV/DV technology is a nascent technology for which standards are still being developed. These standards do not deal with the RF scheduling operation, as it is considered to be an implementation aspect of the system. The performance and the design of the RF scheduler distinguish vendors from one another.

In the present invention, a novel RF scheduler is proposed that takes into consideration feedback such as the user application, the environment, the available power, the Walsh code space, the buffer length, the slot size, the encoder packet size, the kind of transmission, and the like. The scheduling operation performed with all of this feedback guarantees increases in system throughput and higher data and voice user capacity.

To address the above-discussed deficiencies of the prior art, it is a primary object of the present invention to provide an apparatus for providing quality of service for the transmission of data packets from a base station in a wireless network to a plurality of mobile stations in a coverage area of the wireless network. According to an advantageous embodiment of the present invention, the apparatus comprises: 1) a packet discriminator for receiving data packets from a plurality of user devices requesting to transmit data packets to the mobile stations, wherein the packet discriminator determines whether each of the data packets is associated with one of a real time application and a non-real time application; 2) a real time traffic packet processor capable of receiving from the packet discriminator first selected data packets determined to be associated with real time applications; and 3) a non-real time traffic packet processor capable of receiving from the packet discriminator second selected data packets determined to be associated with non-real time applications.

According to one embodiment of the present invention, the packet discriminator determines whether the each data packet is associated with one of a real time application and a non-real time application according to a packet header associated with the each data packet.

According to another embodiment of the present invention, the real time traffic packet processor determines a priority associated with each of the first selected data packets.

According to still another embodiment of the present invention, the real time traffic packet processor stores the each of the first selected data packets in one of at least two priority queues according to the priority associated with the each of the first selected data packets.

According to yet another embodiment of the present invention, the non-real time traffic packet processor determines a priority associated with each of the second selected data packets.

According to a further embodiment of the present invention, the non-real time traffic packet processor stores the each of the second selected data packets in one of at least two priority queues according to the priority associated with the each of the second selected data packets.

According to a still further embodiment of the present invention, the real time traffic packet processor stores the each of the first selected data packets in one of a high priority queue and a medium priority queue.

According to yet further embodiment of the present invention, the non-real time traffic packet processor stores the each of the second selected data packets in one of the medium priority queue and a low priority queue.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
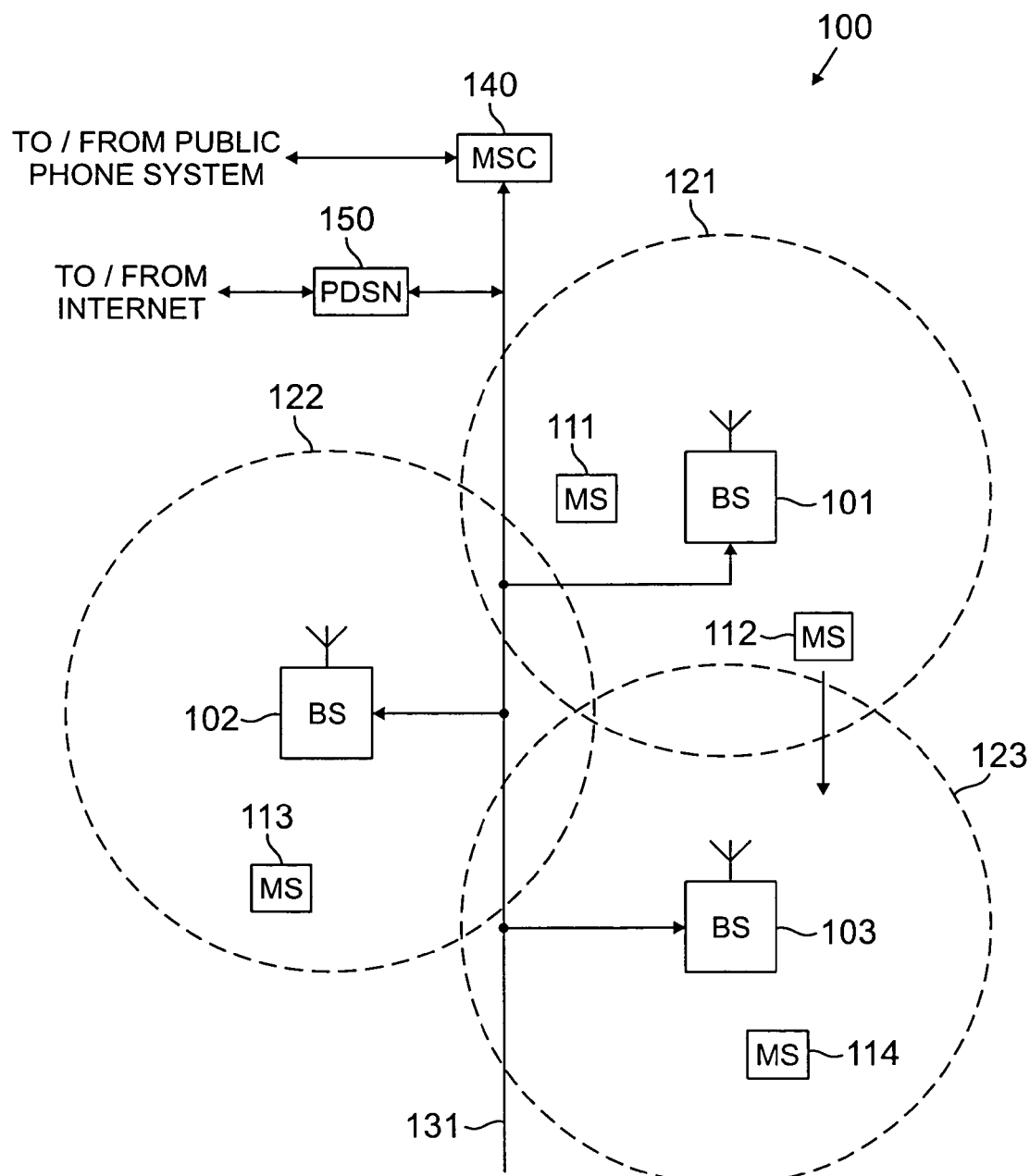
FIG. 1 illustrates an exemplary wireless network according to one embodiment of the present invention.
Figure 2:
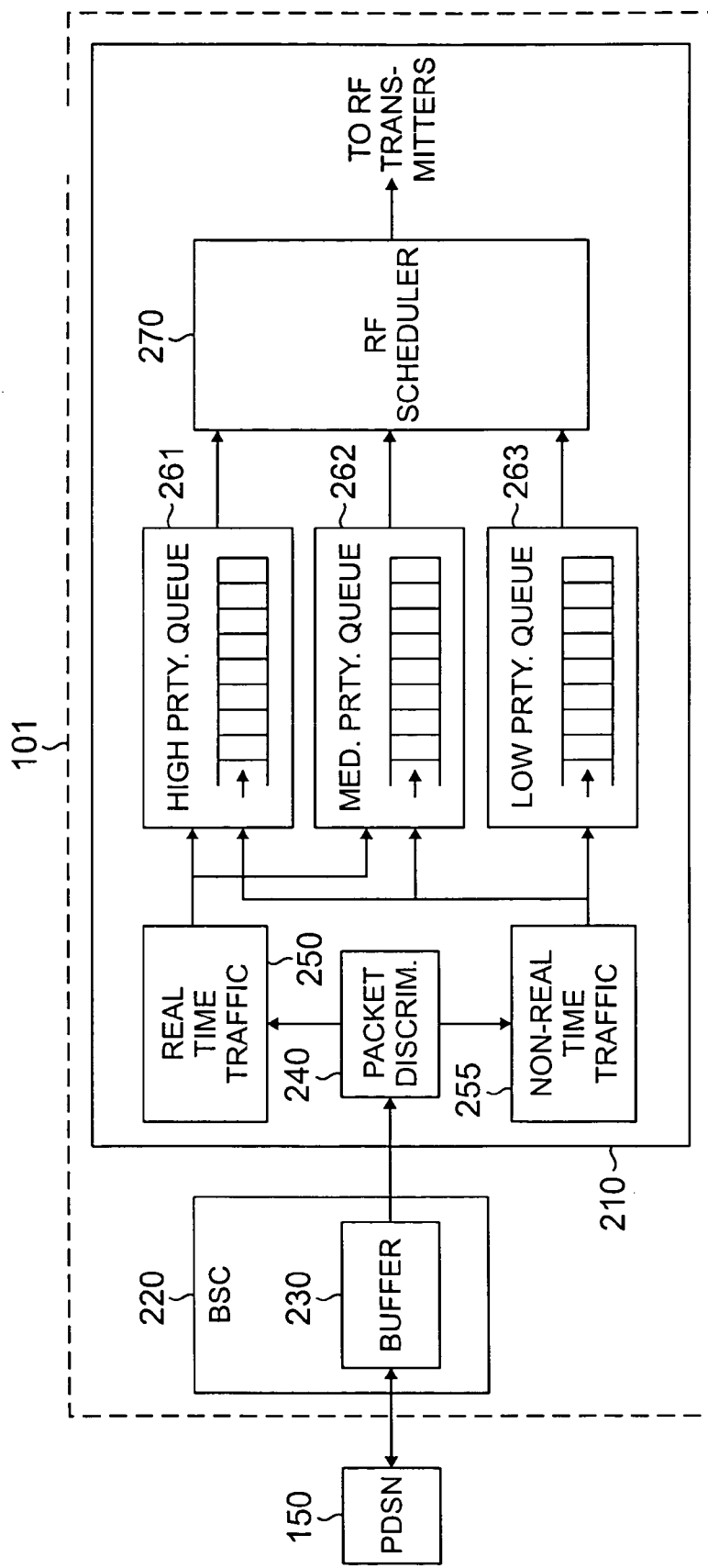
FIG. 2 illustrates an exemplary base station in greater detail according to one embodiment of the present invention.
Figure 3:
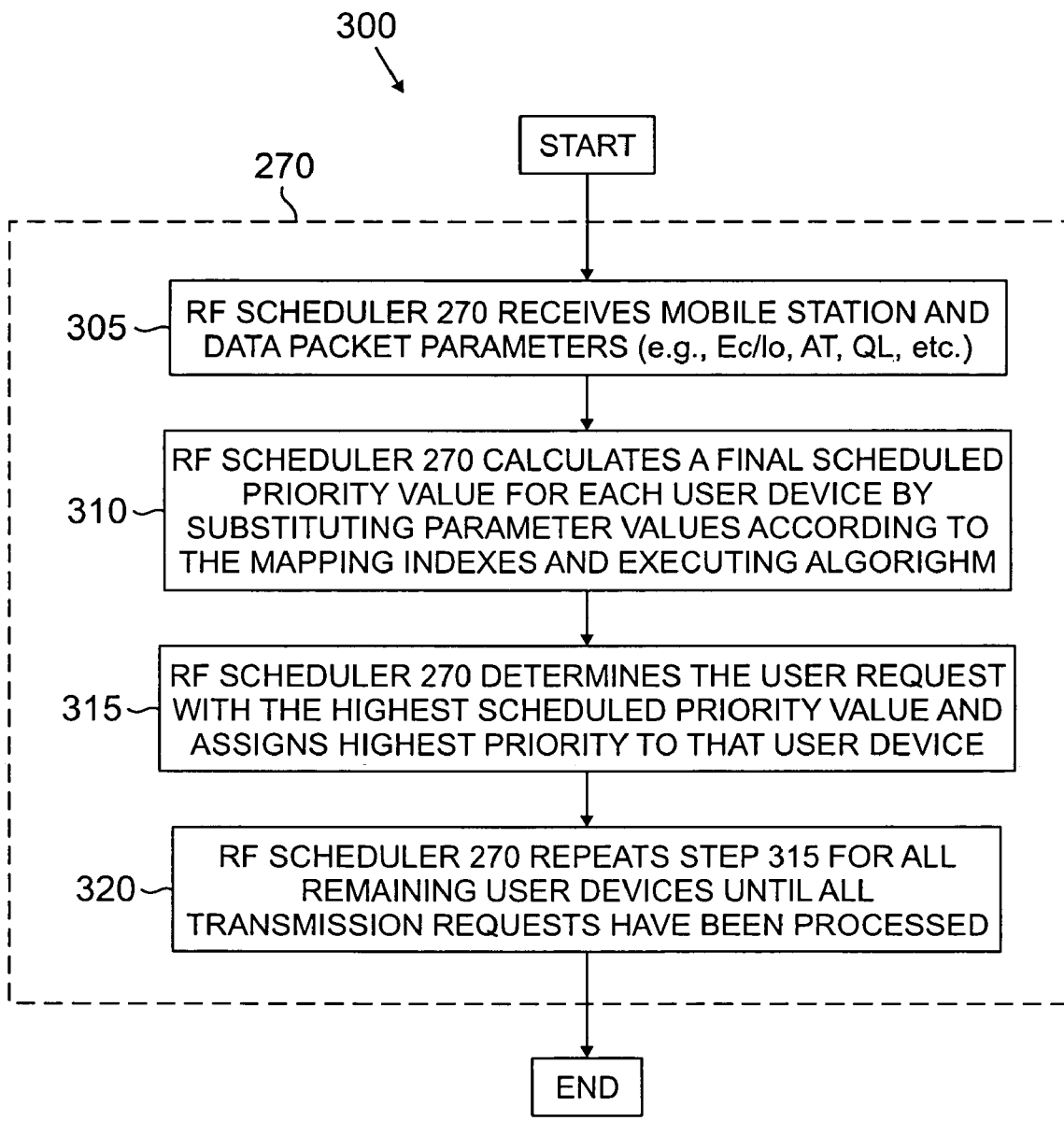
FIG. 3 is a flow diagram illustrating the operation of the exemplary radio frequency (RF) scheduler according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network base station.

FIG. 1 illustrates exemplary wireless network 100 according to one embodiment of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels. Mobile stations 111-114 may be any suitable wireless devices, including conventional cellular radiotelephones, PCS handset devices, personal digital assistants, portable computers, or metering devices. The present invention is not limited to mobile devices. Other types of access terminals, including fixed wireless terminals, may be used. However, for the sake of simplicity, only mobile stations are shown and discussed hereafter.

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any one cell site configuration.

In one embodiment of the present invention, BS 101, BS 102, and BS 103 comprise a base station controller (BSC) and one or more base transceiver subsystem(s) (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center MSC) 140. BS 101, BS 102 and BS 103 also transfer data signals, such as packet data, with the Internet (not shown) via communication line 131 and packet data server node (PDSN) 150. Line 131 also provides the connection path to transfer control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. Those skilled in the art will recognize that the connections on line 131 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on line 131 may provide a transmission path for transmission of analog or digital control signals in a suitable signaling protocol.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

As is well known, the hand-off procedure transfers control of a call from a first cell site to a second cell site. As MS. 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft hand-off process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103. The above-described soft hand-off assumes the mobile station is in a voice or data call. An idle hand-off is the hand-off between cells sites of a mobile station that is communicating in the control or paging channel.

FIG. 2 illustrates exemplary base station 101 in greater detail according to one embodiment of the present invention. Exemplary base station 101 comprises base transceiver subsystem (BTS) 210 and base station controller (BSC) 220. BTS 210 and BSC 220 are similar to the base transceiver subsystems and base station controllers discussed previously with respect to FIG. 1. BTS 210 comprises packet discriminator 240, real time traffic sorter 250, non-real time traffic sorter 255, high priority queue 261, medium priority queue 262, and low priority queue 263, and RF scheduler 270. BSC 220 comprises packet buffer 230.

In order to obtain reliable QoS, the forward channel data traffic is split into real time traffic and non-real time traffic and is prioritized according to a user application or a priority level demanded by the mobile station. Packet data server node (PDSN) 150 sends incoming forward channel data received from the Internet to packet buffer 230 in BSC 220. The packets stored in packet buffer 230 are subsequently sent to BTS 210.

In BTS 210, packet discriminator 240 initially sorts the Internet Protocol (IP) data grams according to the associations to which the data grams belong. Packet discriminator 240 performs this sorting by reading the headers of the IP data grams. Next, the traffic is sorted in terms of real time traffic and non-real time traffic. Packet discriminator 240 transfers real time traffic to real time traffic sorter 250 and transfers non-real time traffic to non-real traffic sorter 255. According to an exemplary embodiment of the present invention, one or more of packet discriminator 240, real time traffic sorter 250 and non-real time traffic sorter 255 may comprise a conventional packet processor implemented using conventional data processors and memory.

Real time traffic sorter 250 sorts the real time traffic into high priority traffic and medium priority traffic. Real time traffic sorter 250 stores the high priority traffic in high priority queue 261 and stores the medium priority traffic in medium priority queue 262. Similarly, non-real time traffic sorter 255 sorts the non-real time traffic into high priority traffic, medium priority traffic, and low priority traffic. Non-real time traffic sorter 255 stores the high priority traffic in high priority queue 261, stores the medium priority traffic in medium priority queue 262, and stores the low priority traffic in low priority queue 263.

RF scheduler 270 determines the scheduling of the transmission of each packet stored in priority queues 261-263 according to various criteria, including: the application, the environment, available power, Walsh code space, buffer length, slot size, encoder packet size, transmission type, and the like. RF scheduler 270 schedules each user on the SCH (supplemental channel) and the F-PDCH (forward packet data channel). According to an exemplary embodiment of the present invention, RF scheduler 270 may comprise a conventional packet processor implemented using a conventional data processors and a memory that stores the scheduling algorithm.

Each mobile station uses the IS-2000 forward pilot channel (F-PICH) for initial acquisition, phase recovery, timing recovery and handoffs. Each mobile station using the F-PDCH measures the F-PICH signal to determine the received channel quality from each antenna sector in the active set. Each mobile station reports the C/I of the target sector at a rate of 800 Hz on the R-CQICH (i.e., C/I feedback is received by the base station every 1.25 milliseconds). This is very fine granularity for the information available, which provides for better scheduling control. Packet users share the forward packet data channel (F-PDCH) by means of time division multiplexing and code division multiplexing.

The RF scheduling functions performed by RF scheduler 270 may be implemented as a centralized operation or as a de-centralized operation. In the centralized operation, the scheduling occurs in BSC 220 and in the decentralized operation, the scheduling occurs in BTS 210. FIG. 2 and the accompanying text illustrated and describe a decentralized operation. However, those skilled in the art will recognize that the embodiment describe herein may easily be modified for implementation in BSC 220.

In the de-centralized operation, upper layer signaling feedback informs BTS 210 as to what application has to be scheduled for a certain user. BTS 210 has the following information readily available: 1) available power, 2) reported C/I by a particular mobile (R-CQICH), 3) available number of Walsh codes, and 4) data present in the buffer for a particular user. A centralized operation may be implemented in BSC 220 along the same lines as the de-centralized operation in BTS 210, except that more signaling is required between BSC 220 and BTS 210.

According to an advantageous embodiment of the present invention, RF scheduler 270 uses the following algorithm to schedule the transmission of forward channel data to a particular mobile station:

$$\text{Scheduled Time} \approx f(\alpha(AWC) + \beta(AT) + \chi(QL) + \delta(AP) + \quad \text{[Eqn. 1]}$$
$$\epsilon(CFB) + \Phi(TQ) + \gamma(TT) + \eta(SS) +$$
$$\lambda(PS) + \mu(MT)),$$

where the coefficients $\alpha$, $\beta$, $\chi$, $\delta$, $\epsilon$, $\Phi$, $\gamma$, $\eta$, $\lambda$ and $\mu$ are real number constants. All the variables are time dependent and change with the time.

The variables in Equation 1 are defined as follows:

a) AWC—Available Walsh Code Space—The base station extracts the possible packet formats based on the given number of Walsh codes. There are a maximum of 24 candidates in EV-DV systems.

b) AT—Application Type—The base station determines the application type being processed at that instance. Real time applications always receive higher priority that non-real time applications. According to an exemplary embodiment of the present invention, AT may be a numerical index value that is stored in a look-up table (or map). For example, for an HTML application, AT may equal 3, for a WAP application, AT may equal 2, and for an FTP application, AT may equal 1.

c) QL—Queue Length—The extent to which one of priority queues 261-263 is filled with data packets for a particular mobile station also effects the scheduling of that user. In case of real time traffic user, the data packets stored in the queue should be sent very soon (i.e., with minimum delay). The queue type also affects this determination. High priority queue 261 always gets first preference over medium priority queue 262 and low priority queue 263.

d) AP—Available Power—BTS 210 determines the power available for scheduling a particular mobile station application. According to an advantageous embodiment of the present invention, BTS 210 is capable of transmitting using different modulation schemes that require different levels of power. Hence, the available power should be considered before allocating and scheduling a particular mobile station application.

e) CFB—C/I Feedback—The C/I feedback provided by the mobile station to BTS 210 determines the air link quality. If a first mobile station has a better wireless link quality (i.e., less fading and noise) than other mobile stations, then that first mobile station has higher priority. In CDMA2000-EV/DV schemes, there is a channel quality feedback channel in which mobile stations transmit the C/I feedback data from which channel quality can be estimated. The maximum amount of data transmission should be done during periods when channel quality is good. According to an exemplary embodiment of the present invention, CFB may be a numerical index value that is stored in a look-up table (or map). The look-up table may contain a sequence of Ec/Io values from, for example, −13 dB up to +13 dB, where each Ec/Io value is mapped to a CFB index value. For example, for values of Ec/Io (dB)=−13, −11, −9, . . . +9, +11, +13, CFB may have values of 1, 2, 3, . . . , 12, 13, 14, respectively.

f) TQ—Time in Queue—The time period during which a particular data packet has stored been in one of priority queues 261-263. The longer the time period during which a data packet has been in the queue, the higher is the priority of that data packet to be allocated in the next scheduled time slot.

g) TT—Transmission Type—Generally, re-transmissions of data packets have a higher priority than first transmissions. The maximum number of re-transmissions possible to achieve a good degree of confidence is four. According to an exemplary embodiment, re-transmission may be based on link quality. Depending on the pre-stored energy, RF scheduler 270 may vary the re-transmission physical characteristics, such as modulation type, slot size, encoder packet size, or the like, to optimize the performance of the system.

h) SS—Slot-Size—Depending on the application being served and the modulation types used for coding the information, the slot-size differs.

i) PS—Payload Size—Different applications require different payload sizes. RF scheduler 270 considers all of the above-mentioned factors and determines the payload size accordingly. Determination of the payload size also essentially determines the appropriate modulation and power level.

j) NT—Modulation Type—The modulation type to be used for scheduling each mobile station depends on the power level, application type, the encoder packet size, and the slot size.

For each encoder packet size, a rate is selected nearest to, but not exceeding, the highest supportable data rate based on the information in the R-CQICH signal and the available power. One encoder packet size is selected based on the data backlog. Taking all the above parameters into consideration before scheduling guarantees fair scheduling and better throughput.

It is apparent that most of the above parameters are interdependent and that parameters should be selected to maximize the system performance. Additionally, the choice of the above variables depends on many factors, some of them being the network design, operator requirements, and the like.

Also, as in the case of CFB and AT, many of these parameters may be represented by numerical index values stored in a look-up table.

In the case of centralized operation, BSC 220 must be notified about the above parameters using control signals. The advantage of the centralized scheduling is possibly better performance across the network compared to the better performance in a particular cell area in case of de-centralized scheduling.

In sum, the advantages of the inventions are:
a) Increased throughput of data users;
b) Increased capacity for data and voice users;
c) Better utilization of RF resources;
d) Improved network performance; and
e) Confined not only to EV-DV (i.e., easily adapted for use in other air-interface technologies.

FIG. 3 is flow diagram 300 illustrating the operation of exemplary radio frequency (RF) scheduler 270 in BTS 210 according to one embodiment of the present invention. During routine operation, RF scheduler 270 receives mobile station and data packet parameters (e.g., Ec/Io, AT, QL, and the like) from within base station 101, from mobile station (MS) 111 and other mobile stations, and from requesting user devices that are trying to transmit data packets to MS 111 and other mobile stations (process step 305). RF scheduler 270 calculates a final scheduled priority value for data packets from each requesting user device by substituting parameter values according to the mapping indexes and executing the algorithm in Equation 1 (process step 310). RF scheduler 270 determines the user request with the highest scheduled priority value and assigns the highest priority to that user device (process step 315). RF scheduler 270 repeats step 315 for all of the remaining user devices until all transmission requests have been processed (process step 320). The prioritized data packets are subsequently transmitted by the transceiver of BTS 210 in the order established by RF scheduler 270.

Although the present invention has been described in detail, those skilled in the art should understand that they can make various changes, substitutions and alterations herein without departing from the spirit and scope of the invention in its broadest form.

What is claimed is:

1. An apparatus for providing quality of service for the transmission of data packets from a base station in a wireless network to a plurality of mobile stations in a coverage area of said wireless network, said apparatus comprising:
   a packet discriminator to receive data packets from a plurality of user devices requesting to transmit data packets to said mobile stations, wherein said packet discriminator determines whether each of said data packets is associated with one of a real time application and a non-real time application;
   a real time traffic packet processor capable of receiving from said packet discriminator first selected data packets determined to be associated with real time applications;
   a non-real time traffic packet processor capable of receiving from said packet discriminator second selected data packets determined to be associated with non-real time applications; and
   a transmission scheduler capable of scheduling transmission of the first selected data packets and the second selected data packets by determining which of the first selected data packets and the second selected data packets has a highest scheduled priority based upon a type of application associated with a packet, a number of packets awaiting transmission to a mobile station associated with said packet, a measured quality of a wireless link to said mobile station, and a determination of whether said packet is being retransmitted to said mobile station.

2. The apparatus as set forth in claim 1 wherein said packet discriminator determines whether said each data packet is associated with one of a real time application and a non-real time application according to a packet header associated with said each data packet.

3. The apparatus as set forth in claim 2 wherein said real time traffic packet processor determines a priority associated with each of said first selected data packets.

4. The apparatus as set forth in claim 3 wherein said real time traffic packet processor stores said each of said first selected data packets in one of at least two priority queues according to said priority associated with said each of said first selected data packets.

5. The apparatus as set forth in claim 4 wherein said non-real time traffic packet processor determines a priority associated with each of said second selected data packets.

6. The apparatus as set forth in claim 5 wherein said non-real time traffic packet processor stores said each of said second selected data packets in one of at least two priority queues according to said priority associated with said each of said second selected data packets.

7. The apparatus as set forth in claim 6 wherein said real time traffic packet processor stores said each of said first selected data packets in one of a high priority queue and a medium priority queue.

8. The apparatus as set forth in claim 7 wherein said non real time traffic packet processor stores said each of said second selected data packets in one of said medium priority queue and a low priority queue.

9. The apparatus as set forth in claim 8 wherein said transmission scheduler is further capable of retrieving said first and second selected data packets from said high, medium and low priority queues and scheduling said first and second selected data packets to be transmitted.

10. A wireless network comprising a plurality of base stations capable of communicating with a plurality of mobile stations in a coverage area of said wireless network, wherein a first one of said plurality of base stations comprises an apparatus for providing quality of service for the transmission of data packets from said first base station, said apparatus comprising:
    a packet discriminator to receive data packets from a plurality of user devices requesting to transmit data packets to said mobile stations, wherein said packet discriminator determines whether each of said data packets is associated with one of a real time application and a non-real time application;
    a real time traffic packet processor capable of receiving from said packet discriminator first selected data packets determined to be associated with real time applications;
    a non-real time traffic packet processor capable of receiving from said packet discriminator second selected data packets determined to be associated with non-real time applications; and
    a transmission scheduler capable of scheduling transmission of the first selected data packets and the second selected data packets by determining which of the first selected data packets and the second selected data packets has a highest scheduled priority based upon a type of application associated with a packet, a number of packets awaiting transmission to a mobile station associated with said packet, a measured quality of a wireless link to said mobile station, and a determination of whether said packet is being retransmitted to said mobile station.

11. The wireless network as set forth in claim 10 wherein said packet discriminator determines whether said each data packet is associated with one of a real time application and a non-real time application according to a packet header associated with said each data packet.

12. The wireless network as set forth in claim 11 wherein said real time traffic packet processor determines a priority associated with each of said first selected data packets.

13. The wireless network as set forth in claim 12 wherein said real time traffic packet processor stores said each of said first selected data packets in one of at least two priority queues according to said priority associated with said each of said first selected data packets.

14. The wireless network as set forth in claim 13 wherein said non-real time traffic packet processor determines a priority associated with each of said second selected data packets.

15. The wireless network as set forth in claim 14 wherein said non-real time traffic packet processor stores said each of said second selected data packets in one of at least two priority queues according to said priority associated with said each of said second selected data packets.

16. The wireless network as set forth in claim 15 wherein said real time traffic packet processor stores said each of said first selected data packets in one of a high priority queue and a medium priority queue.

17. The wireless network as set forth in claim 16 wherein said non-real time traffic packet processor stores said each of said second selected data packets in one of said medium priority queue and a low priority queue.

18. The wireless network as set forth in claim 17 wherein said transmission scheduler is further capable of retrieving said first and second selected data packets from said high, medium and low priority queues and scheduling said first and second selected data packets to be transmitted.

19. A method of providing quality of service for the transmission of data packets from a base station in a wireless network to a plurality of mobile stations in a coverage area of the wireless network, the method comprising the steps of:

receiving data packets from a plurality of user devices requesting to transmit data packets to the mobile stations;

determining whether each of the data packets is associated with one of a real time application and a non-real time application;

if a first selected one of the data packets is determined to be associated with a real time application, determining a priority associated with the first selected data packet;

if a second selected data packet is determined to be associated with a non-real time application, determining a priority associated with the second selected data packet; and scheduling transmission of the first selected data packets and the second selected data packets by determining which of the first selected data packets and the second selected data packets has a highest scheduled priority based upon a type of application associated with a packet, a number of packets awaiting transmission to a mobile station associated with said packet, a measured quality of a wireless link to said mobile station, and a determination of whether said packet is being retransmitted to said mobile station.

20. The method as set forth in claim 19 wherein the step of determining whether each of the data packets is associated with one of a real time application and a non-real time application comprises the sub-step of examining a packet header associated with each data packet.

21. The method as set forth in claim 20 further comprising the step of storing the first selected data packet in one of at least two priority queues according to the priority associated with the first selected data packet.

22. The method as set forth in claim 21 wherein the step of storing comprises the step of storing the first selected data packet in one of a high priority queue and a medium priority queue.

23. The method as set forth in claim 20 further comprising the step of storing the second selected data packets in one of at least two priority queues according to the priority associated with the second selected data packet.

24. The method as set forth in claim 23 wherein the step of storing comprises the step of storing the second selected data packet in one of a medium priority queue and a low priority queue.

* * * * *